(12) United States Patent
Dohi et al.

(10) Patent No.: US 6,931,914 B2
(45) Date of Patent: Aug. 23, 2005

(54) COMBUSTION CONDITION DETECTION APPARATUS FOR AN INTERNAL COMBUSTION ENGINE

(75) Inventors: Masakazu Dohi, Hyogo (JP); Toshio Uchida, Hyogo (JP); Yoshiyuki Sera, Tokyo (JP); Yasuhiro Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 217 days.

(21) Appl. No.: 10/422,816

(22) Filed: Apr. 25, 2003

(65) Prior Publication Data

US 2004/0025570 A1 Feb. 12, 2004

(30) Foreign Application Priority Data

Aug. 6, 2002 (JP) ........................................ 2002-228837

(51) Int. Cl.$^7$ .............................................. G01L 23/32
(52) U.S. Cl. .................................................... 73/35.08
(58) Field of Search .............................. 73/38.08, 117.3

(56) References Cited

U.S. PATENT DOCUMENTS 5,675,072 A * 10/1997 Yasuda et al. ............. 73/35.08

6,000,276 A * 12/1999 Mogi et al. ................. 73/35.08
6,378,494 B1 * 4/2002 Hatazawa et al. ...... 123/406.39
6,550,456 B1 * 4/2003 Uchida et al. .............. 123/479

FOREIGN PATENT DOCUMENTS

| JP | 11-351053 A | 12/1999 |
|---|---|---|
| JP | 2001-073862 A | 3/2001 |
| JP | 2001-140740 A | 5/2001 |

* cited by examiner

*Primary Examiner*—Robert Raevis
(74) *Attorney, Agent, or Firm*—Sughrue Mion, PLLC (57) ABSTRACT

A combustion condition detecting apparatus for an internal combustion engine has a current distributor that distributes an ion current, a band pass filter which extracts a knock vibration component from a current distributor output, a knock determination section which outputs a knock pulse if the extracted knock vibration component is larger than a knock detection threshold value, a combustion determination section which outputs a combustion pulse when an current distributor output is larger than a combustion pulse threshold value, an ignition signal determination section which makes a determination on the basis of an ignition signal as to whether energization of an ignition coil for ignition in another cylinder is started, and an ion current limiting section which limits its ion current output to the current distributor during a predetermined time period after the start of energization of the ignition coil for ignition in the another cylinder.

10 Claims, 12 Drawing Sheets

COMBUSTION CONDITION DETECTION APPARATUS FOR AN INTERNAL COMBUSTION ENGINE

BACKGROUND OF THE INVENTION

1. Field of the Invention

The present invention relates to a combustion condition detection apparatus for an internal combustion engine for sensing at least the occurrence of a misfire or a knock in an internal combustion engine by detecting a change in the amount of ions generated by combustion in the internal combustion engine.

2. Description of the Related Art

It is generally known that ions are generated when a fuel is combusted in a cylinder of an internal combustion engine. If a probe to which a high voltage is applied is placed in the cylinder, the generated ions can be observed as an ion current.

When a knock occurs in the internal combustion engine, a vibration component due to the knock is superimposed on the ion current. Therefore it is possible to detect the occurrence of a knock by extracting such a vibration component.

Figure 9:
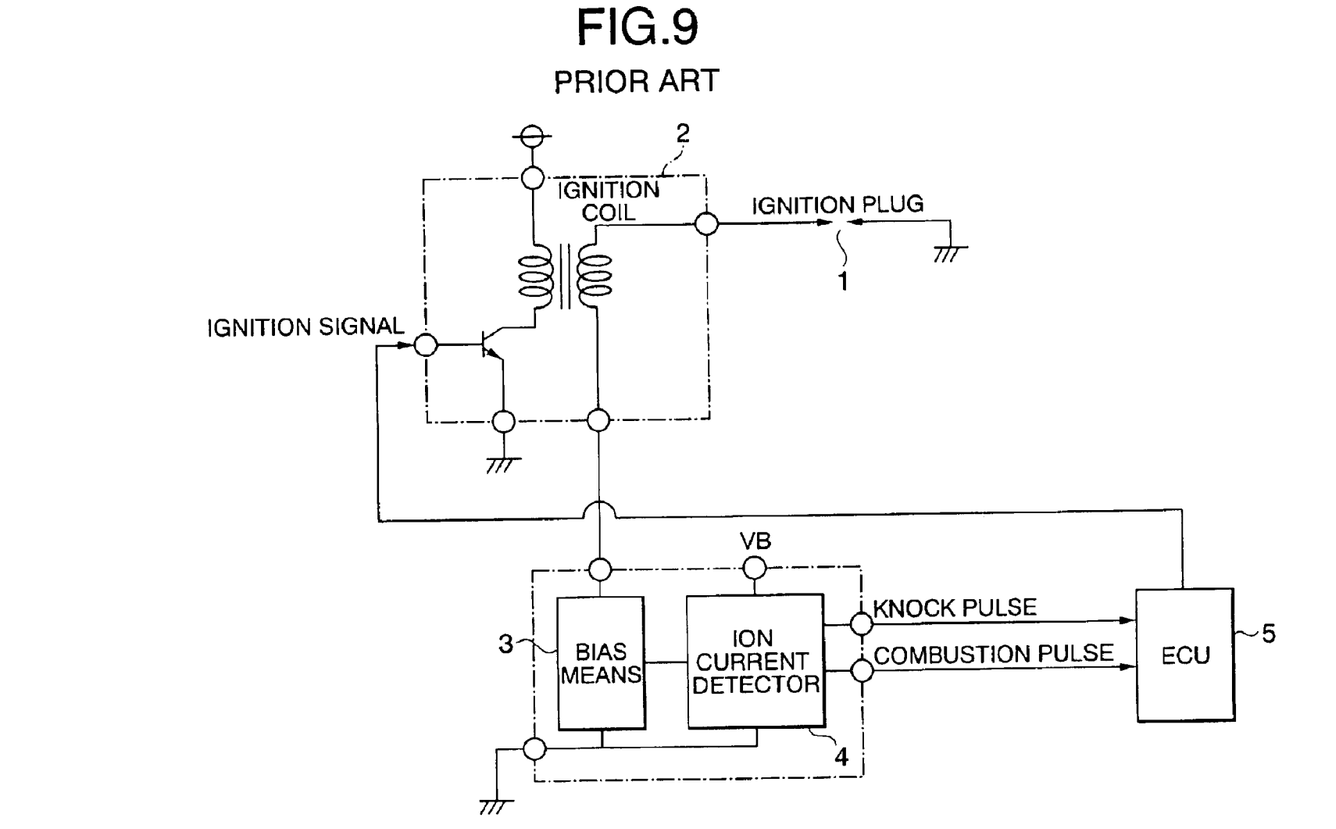
FIG. 9 is a diagram showing the structure of a conventional combustion condition detection apparatus for an internal combustion engine.
Figure 10:
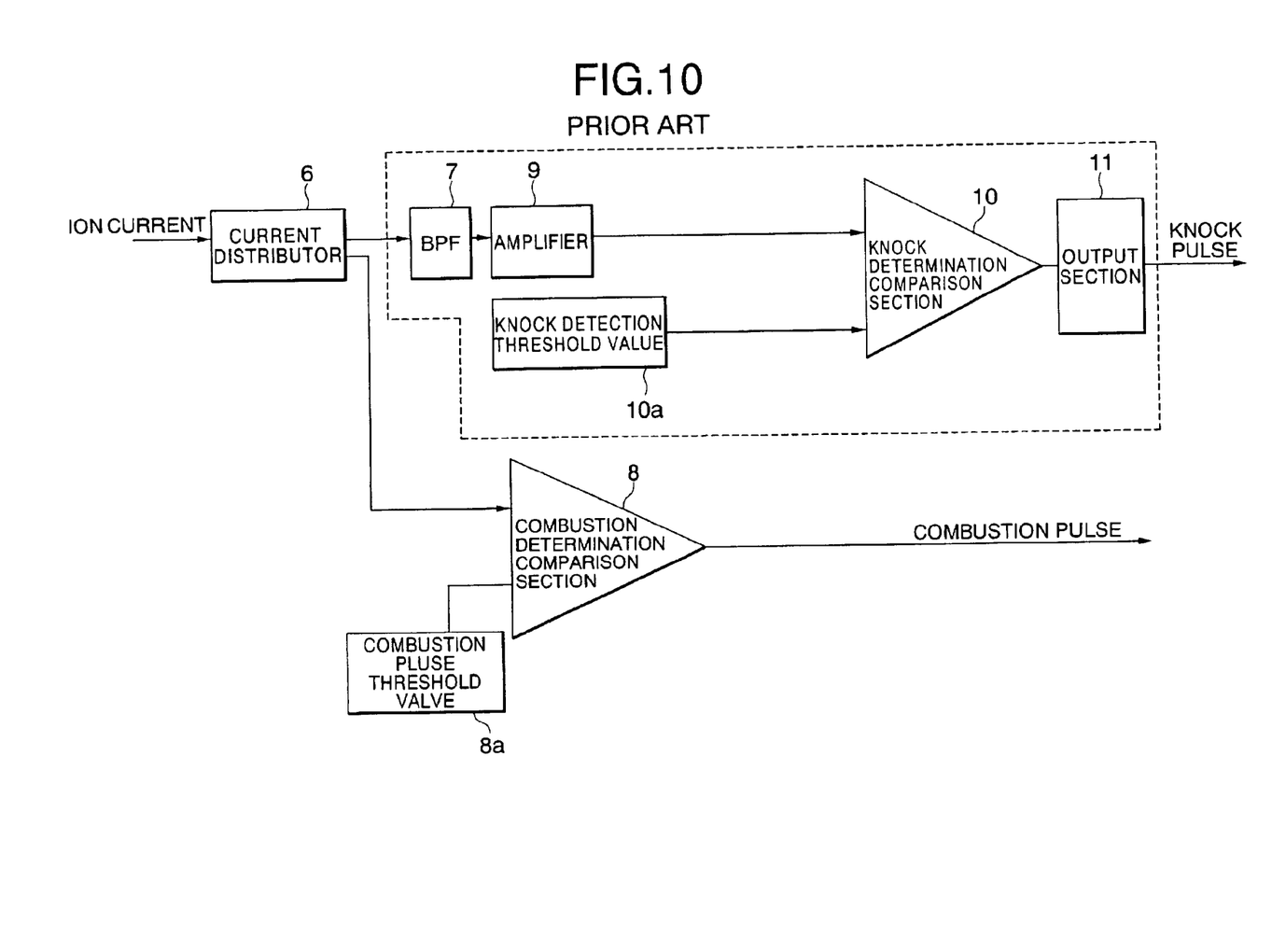
FIG. 10 is a diagram showing the structure of an ion current detector in the conventional combustion condition detection apparatus for the internal combustion engine.
Figure 11:
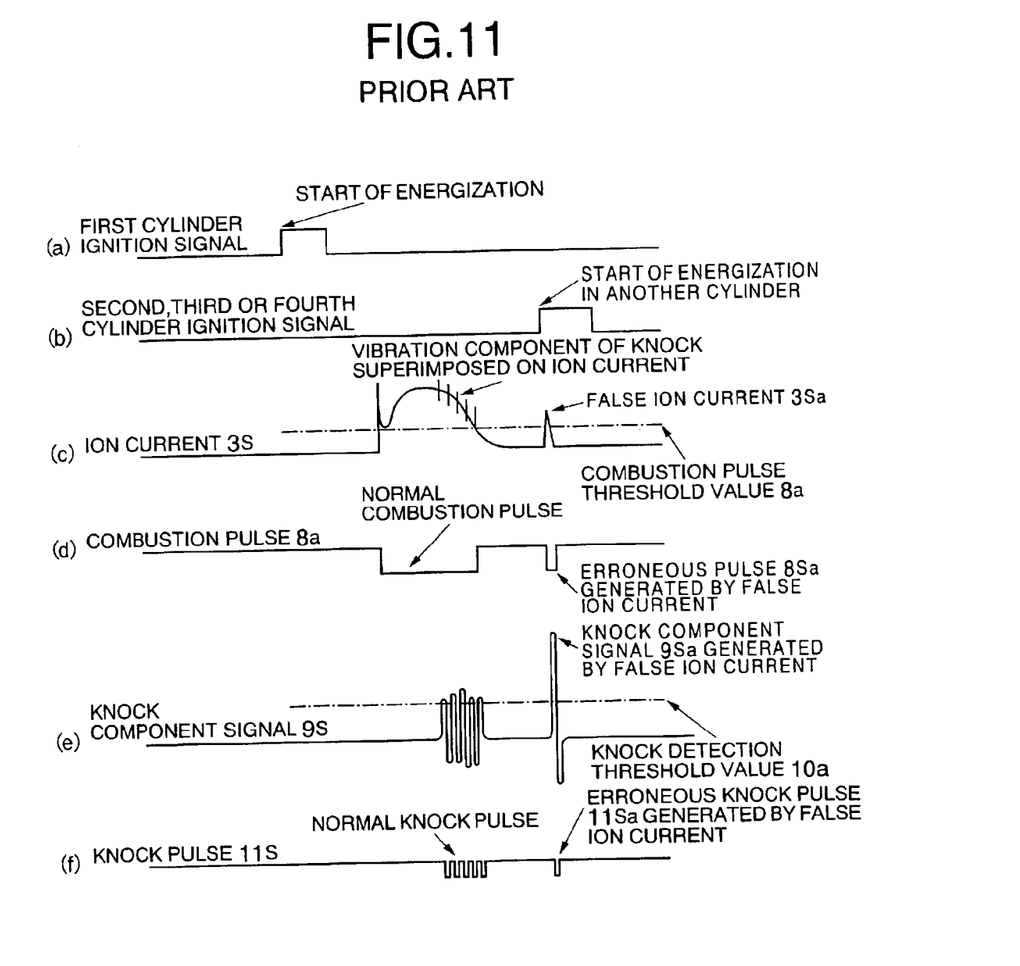
FIG. 11 is a timing chart showing the operation of the conventional ion current detector.

A conventional knock detection apparatus will be described with reference to drawings. FIG. 9 is a diagram showing the structure of a conventional combustion condition detecting apparatus for an internal combustion engine by using ion current, e.g., the one disclosed in Japanese Patent Laid-Open No. 2001-140740. FIG. 10 is a diagram showing details of the structure of an ion current detector in the conventional combustion condition detecting apparatus for an internal combustion engine. FIG. 11 is a timing chart for explaining the operation of the conventional knock detection apparatus.

Referring to FIG. 9, an ignition plug 1 is used as a probe for detecting an ion current. A bias means 3 is charged at a high voltage (bias voltage) for detection of ion current by using a secondary voltage of an ignition coil 2. After the completion of discharge for ignition, the bias voltage of charge accumulated in the bias means 3 during the discharge period is applied to the terminal of the ignition plug 1 to enable an ion current to be detected by an ion current detector 4 connected to an engine control unit (ECU) 5.

Referring to FIG. 10, when ion current 3s is input by the high voltage applied by the bias means 3, it is distributed by a current distributor 6 in the ion current detector 4 to a band pass filter (BPF) 7 for extracting a knock vibration component and a comparison section 8 for determination of a combusting condition. This comparison section 8 determines that combustion is being effected and outputs a pulse to the ECU 5 if the input is larger than a predetermined combustion pulse threshold value 8a. From this pulse, a combusting/misfiring condition can be determined. This pulse will hereinafter be referred to as combustion pulse 8s.

A knock vibration component is extracted by the BPF 7 and then amplified by an amplifier 9. A comparison section 10 for determination of a knock determines that there is a knock if the vibration component is larger than a predetermined knock detection threshold value 10a, and then an output section 11 outputs a knock pulse 11s to the ECU 5.

Japanese Patent Laid-Open No. 2001-073862 discloses a knock detection apparatus which has an integration circuit for integrating (charging) a vibration component superimposed on an ion current, and a discharge circuit for discharging a predetermined amount of charge from the charge obtained as a result of the integration (charging), and which autonomously adjusts a knock detection threshold value according to discharge balance between the integration circuit and the discharge circuit.

Figure 12:
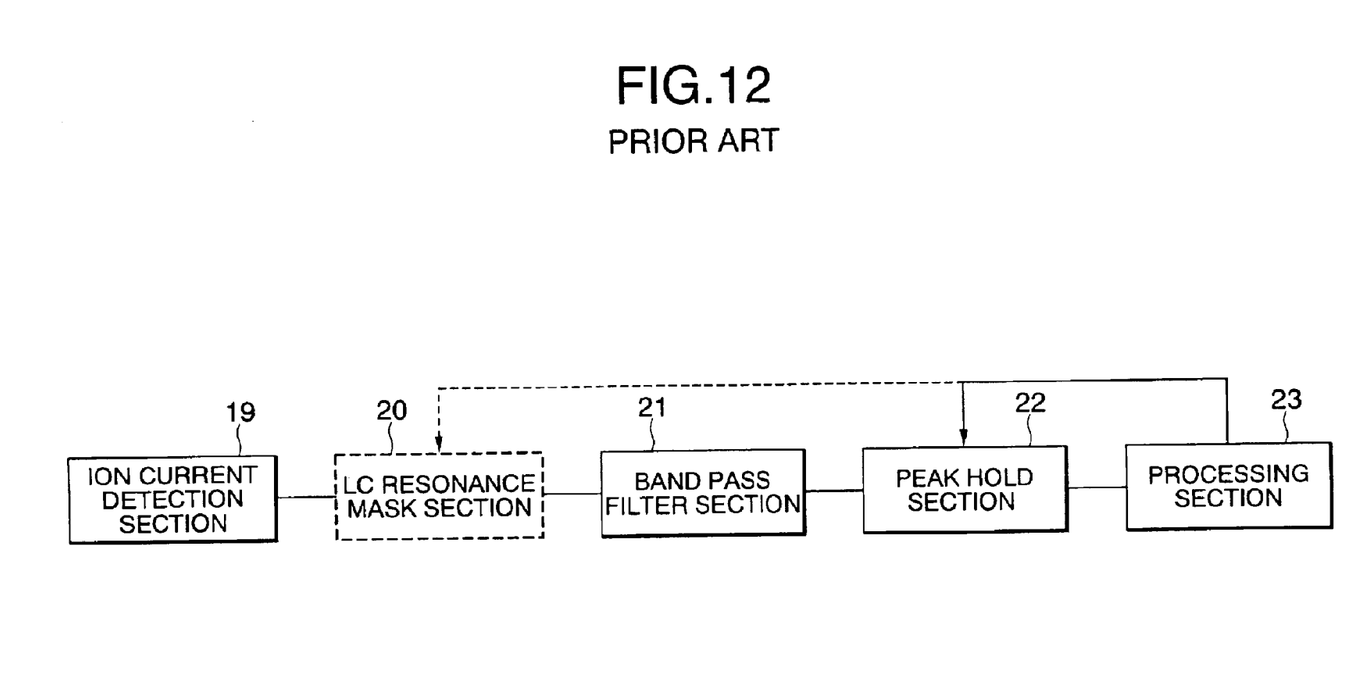
FIG. 12 is a diagram showing the structure of another conventional ion current detector.

Further, Japanese Patent Laid-Open No. 10-077944 discloses a knock detection apparatus described below. FIG. 12 is a diagram showing the structure of another conventional knock detection apparatus disclosed in Japanese Patent Laid-Open No. 10-077944.

When a knock occurs in an internal combustion engine, a knock signal at a particular frequency is superimposed on an ion current in a decreasing period after the ion current has peaked. As means for detecting a knock through ion current, therefore, a method of detecting only such a knock signal at a particular frequency while removing other signals (e.g., an LC resonance waveform) is preferably used. Therefore, it is preferable to provide a knocking window which is opened at a time after a time when unnecessary signals disappear and which is closed at a suitable time after a decrease in ion current (for example, at ATDC60°), and to detect a knock on the basis of an output from an ion current detection section during a time period through which the knocking window is open.

A "knocking detection method using ion current" has already been proposed (see JP 06-159129 A) in which a knock signal is separated from an output signal from this ion current detection section by using a band pass filter and is integrated and a knock is detected on the basis of the integrated value.

Referring to FIG. 12, an LC resonance waveform is removed from an output from an ion current detection section 19 by an LC resonance mask section 20 and the output from the ion current detection section 19 is thereafter input to a processing section 23 via a band pass filter section 21 and a peak hold (or integration) section 22. The operation of the peak hold section 22 is controlled through an window which is opened following a predetermined time after ignition according to the rotational speed of the internal combustion engine and the load on the internal combustion engine, and which is closed at a closing time corresponding to about 50°CA in terms of crank angle after opening. Noise components are removed by utilizing a phenomenon in which an integral value of noise assumed to be an instantaneous change in ion concentration increases in a stepping manner and a phenomenon in which an integral value of a knock signal increases continuously. It is well known that the LC resonance mask section 20 is provided between the ion current detection section 19 and the band pass filter section 21 for the purpose of eliminating the influence of LC resonance after discharge.

In the above-mentioned conventional knock detection apparatus disclosed in Japanese Patent Laid-Open No. 2001-140740, when energization of the ignition coil for ignition in another or the next cylinder is started, a false ion current 3sa is generated by electromagnetic induction caused by the start of energization of the ignition coil for ignition in the another or next cylinder, as shown in (c) of FIG. 11. False ion current 3sa appears as if combustion is effected or a knock occurs in the cylinder corresponding to the ignition coil through which ion current detection is being performed. A false knock component signal 9sa is generated as a knock component signal 9s by false ion current 3sa, as shown in (e) of FIG. 11. At this time, an erroneous knock pulse 11sa is generated as a knock pulse 11s, as shown in (f) of FIG. 11. Also, an erroneous combustion pulse 8sa is generated as a combustion pulse 8s, as shown in (d) of FIG. 11. Thus, there has been a problem in that there is a fear of erroneous combustion determination or erroneous knock determination.

The method of autonomously adjusting a knock detection threshold value according to discharge balance between an integration circuit and a discharge circuit has a problem in that even when no knock occurs, there is a fear of charging with a knock component signal generated by a false ion current, which increases the threshold value for detection of knocks, resulting in detection failure.

Further, the method of separating a knock signal from an output signal from the ion current detection section 19 by using the band pass filter section 21, integrating (holding the peak of) the separated knock signal, and detecting a knock on the basis of the integral (held peak) value has a problem in that a knock component signal generated by a false ion current cannot be removed by the band pass filter section 21, it is, therefore, impossible to discriminate the knock component signal generated by the false ion current and a knock from each other with reliability, and there is a fear of occurrence of a detection result erroneously indicating a knock.

SUMMARY OF THE INVENTION

In view of the above-mentioned problems, an object of the present invention is to provide a combustion condition detection apparatus for an internal combustion engine capable of preventing erroneous combustion determination and erroneous knock determination and effectively improving the detection accuracy.

According to the present invention, a combustion condition detecting apparatus for an internal combustion engine includes an ignition coil, an ignition plug, and an ion current detector. The ignition coil generates a high voltage for ignition on the basis of an ignition signal, and the ignition plug makes a spark to ignite a fuel-air mixture when the high voltage for ignition of the ignition coil is applied thereto. Further, the ion current detector detects an ion current generated in a combustion chamber in the internal combustion engine immediately after ignition, and extracts a knock vibration component from the detected ion current. In addition, the ion current detector outputs a knock pulse when the knock vibration component is larger than a knock detection threshold value, and inhibits detection of the ion current while a false ion current is being generated. As a result, there is obtained such an effect that erroneous combustion determination and erroneous knock determination can be avoided, thereby being capable of greatly improving the detection accuracy.

Further, in another embodiment mode of the present invention, a combustion condition detecting apparatus for an internal combustion engine includes an ignition coil, an ignition plug, and an ion current detector. The ignition coil generates a high voltage for ignition on the basis of an ignition signal, and the ignition plug makes a spark to ignite a fuel-air mixture when the high voltage for ignition of the ignition coil is applied thereto. In addition, the ion current detector detects an ion current generated in a combustion chamber in the internal combustion engine immediately after ignition, extracts a knock vibration component from the detected ion current, outputs a knock pulse when the knock vibration component is larger than a knock detection threshold value, and inhibits detection of the knock vibration component while a false ion current is being generated. As a result, there is obtained such an effect that erroneous knock determination can be avoided, thereby being capable of greatly improving the detection accuracy.

DESCRIPTION OF THE PREFERRED EMBODIMENTS

Embodiment 1

Figure 1:
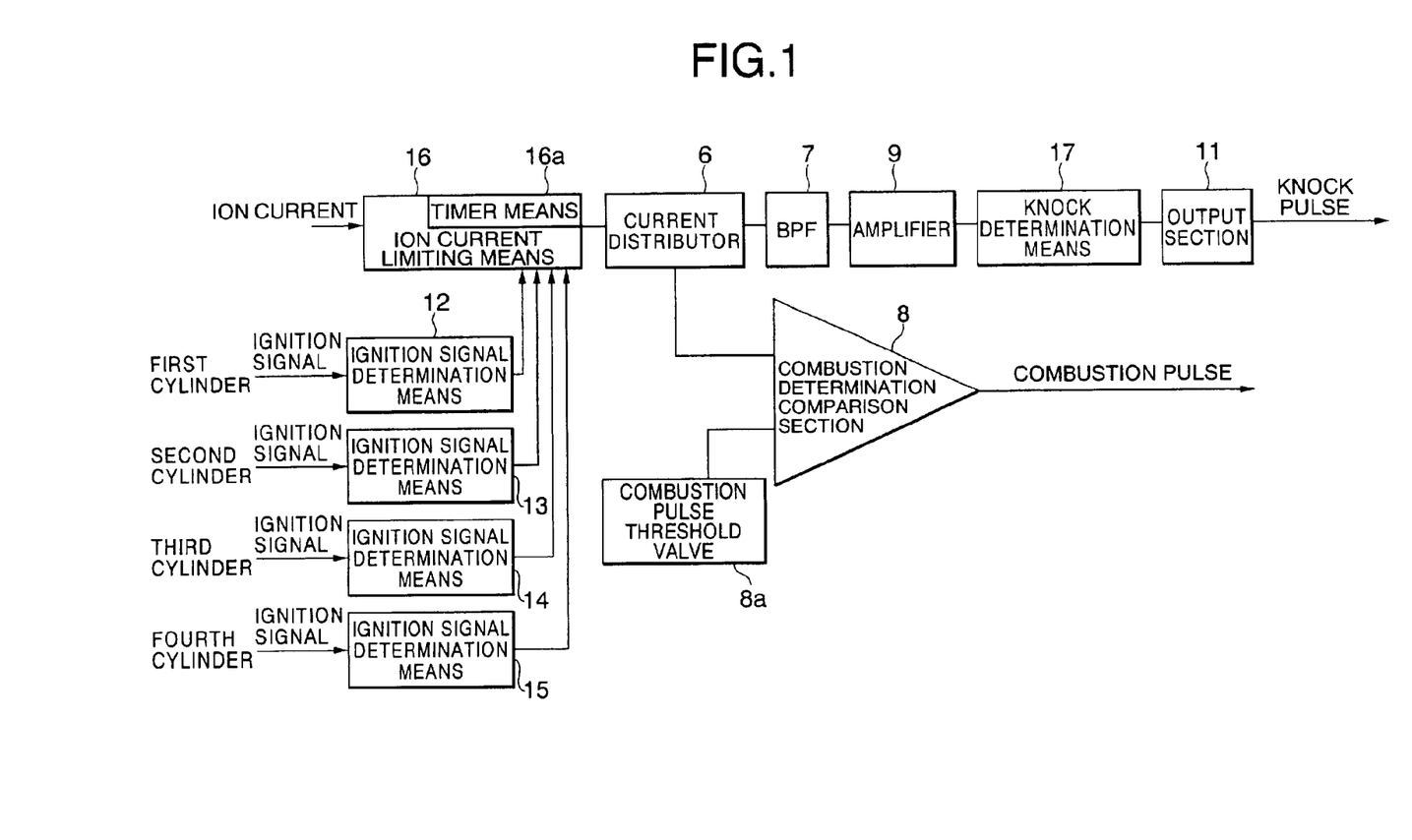
FIG. 1 is a diagram showing the structure of an ion current detector in a combustion condition detection apparatus for an internal combustion engine in Embodiment 1 of the present invention.

A combustion condition detection apparatus for an internal combustion engine in accordance with Embodiment 1 of the present invention will be described with reference to the drawings. FIG. 1 is a diagram showing the structure of an ion current detector in Embodiment 1 of the present invention. Components other than the ion current detector are the same as those in the above-mentioned example of conventional art. In each of Embodiments described below, the difference from the conventional art also resides only in the ion current detector. In the drawings, the same reference symbols indicate identical or corresponding portions.

Referring to FIG. 1, the ion current detector has an ion current limiting means 16, a timer means 16a, ignition signal determination means 12 to 15, a current distributor 6, a BPF 7, a comparison section 8 for determination of a combusting condition, a combustion pulse threshold value 8a, an amplifier 9, a knock determination means 17, and an output section 11. The knock determination means 17 is the same as the knock determination comparison section 10 shown in FIG. 10, i.e., the section in which the existence of a knock is determined if the vibration component of the knock component signal is larger than the predetermined knock detection threshold value 10a. The comparison section 8 for determination of a combusting condition and the combustion pulse threshold value 8a constitute a combustion determination means.

The operation of the combustion condition detection apparatus for the internal combustion engine in Embodiment 1 of the present invention will now be described with reference to the drawings.

Figure 2:
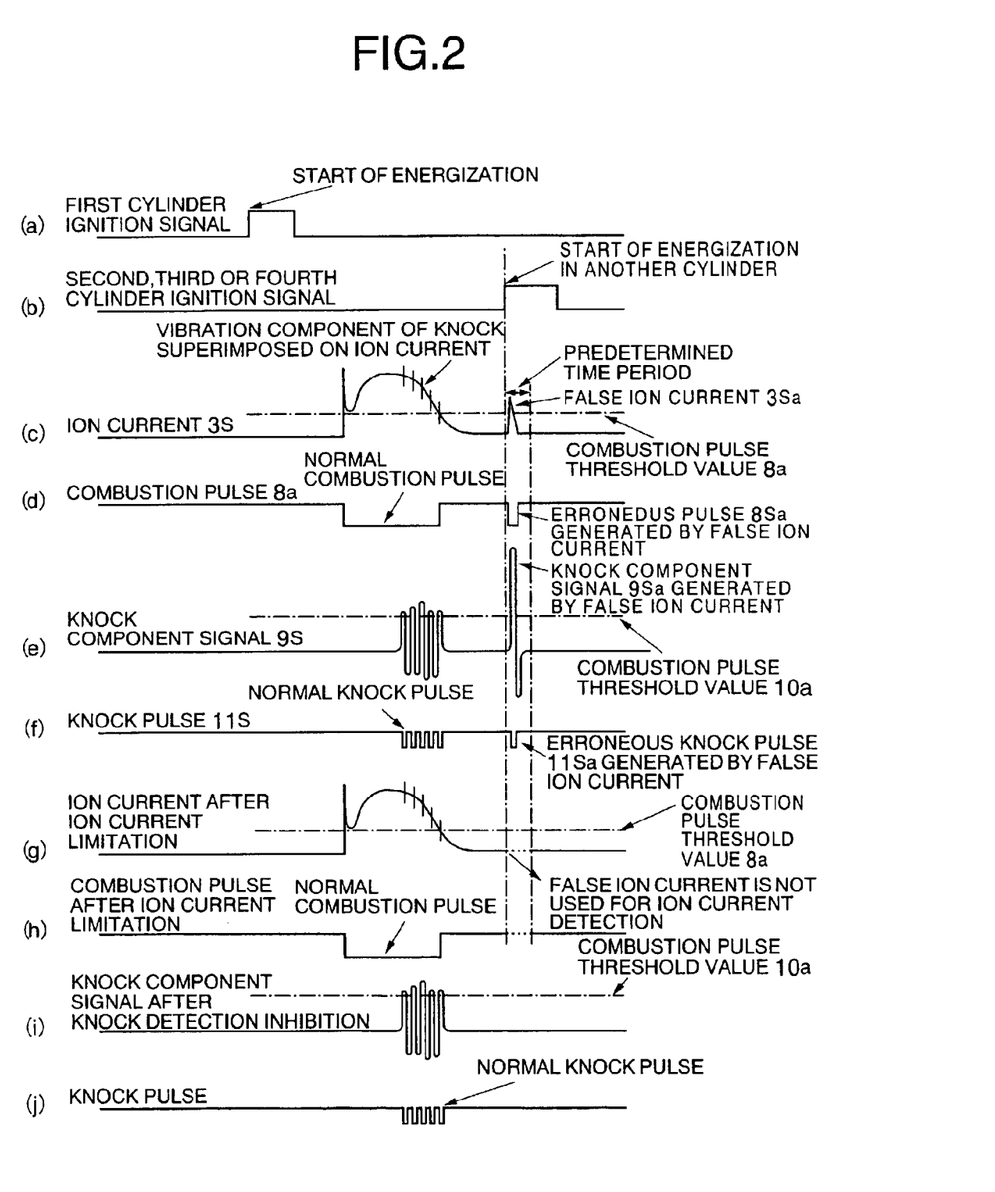
FIG. 2 is a timing chart showing the operation of the ion current detector in Embodiment 1 of the present invention.
Figure 3:
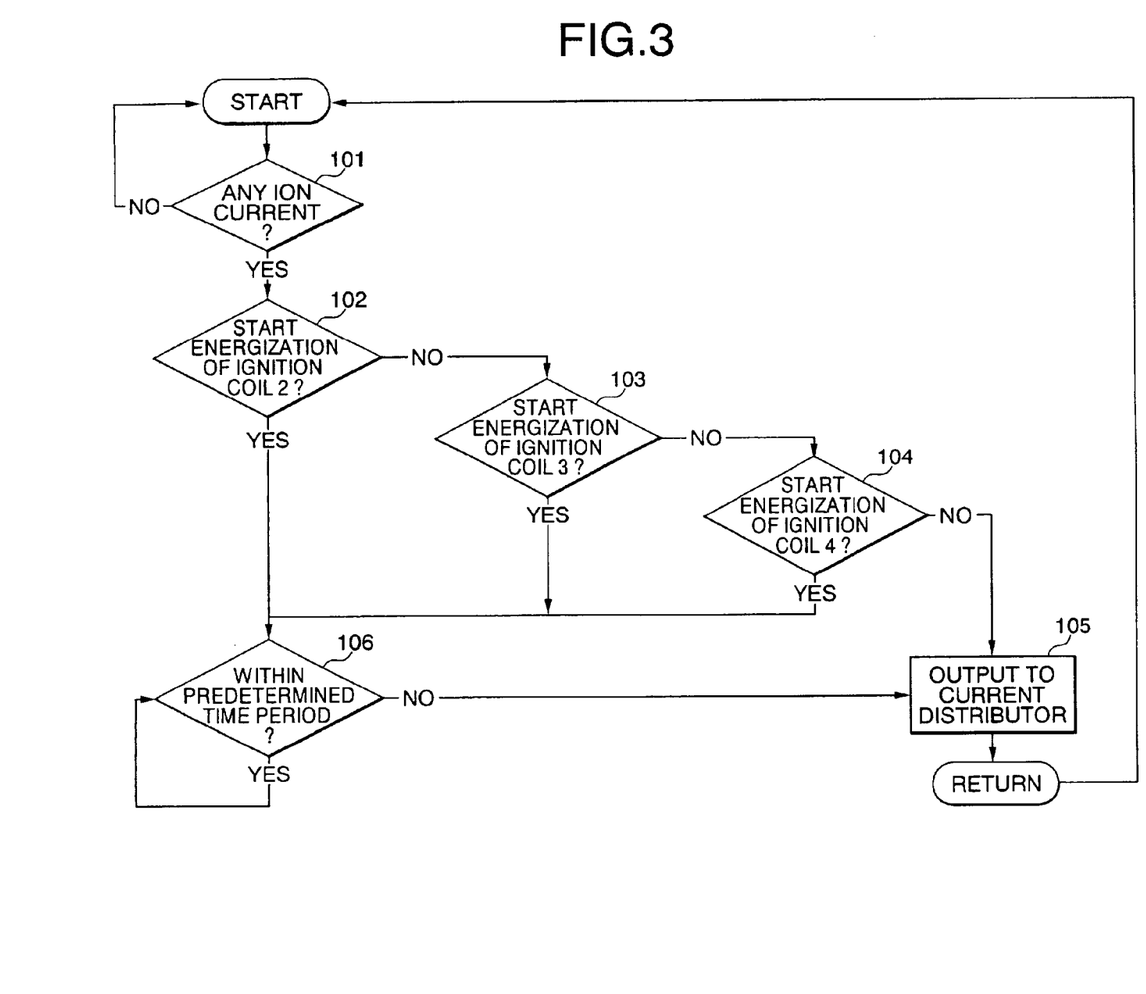
FIG. 3 is a flowchart showing the operation of the ion current detector in Embodiment 1 of the present invention.

FIG. 2 is a timing chart showing the operation of the ion current detector in Embodiment 1 of the present invention. FIG. 3 is a flowchart showing the operation of the ion current detector in Embodiment 1 of the present invention.

The description will be made of ion current detection from one of a plurality of cylinders (four cylinders). The detection from each of the other cylinders (second to fourth cylinders) is performed in the same manner as that from the first cylinder.

A false ion current 3sa is generated by electromagnetic induction caused when energization of the ignition coil in another of the other cylinders (second to fourth cylinders) is started, as shown in (c) of FIG. 2. A false knock component signal 9sa is generated as a knock component signal 9s by false ion current 3sa, as shown in (e) of FIG. 2. At this time, an erroneous knock pulse 11sa is generated as a knock pulse 11s, as shown in (f) of FIG. 2. Also, an erroneous combustion pulse 8sa is generated as a combustion pulse 8s, as shown in (d) of FIG. 2.

The ion current is limited by the ion current limiting means 16 so that the ion current is as shown in (g) of FIG. 2 and the combustion pulse is as shown in (h) of FIG. 2. After the limitation, no false ion current is detected.

The knock component signal is made as shown in (i) of FIG. 2. Also, as a result of the limitation of the ion current, the knock pulses are formed only of normal knock pulses, as shown in (j) of FIG. 2. That is, the ion current limiting means 16 limits the combustion pulses 8s and knock pulses 11s obtained as a combustion detection result.

The operation will be described in detail with reference to the flowchart of FIG. 3.

In step 101, detection of ion current is performed by the ion current limiting means 16. If there is no ion current, detection of ion current is performed again, if there is an ion current, the process advances to step 102.

In steps 102 to 104, determination is made by ignition signal determination means 13 to 15 as to whether energization of one of the ignition coils 2 to 4 is started. If energization of any of the ignition coils 2 to 4 is not started, the process advances to step 105. If energization of one of the ignition coils 2 to 4 is started, the process advances to step 106.

In step 105, the ion current is output from the ion current limiting means 16 to the current distributor 6. The current distributor 6 outputs currents to the BPF 7 and the comparison section for determination of a combusting condition.

On the other hand, in step 106, determination is made by the timer means 16a in the ion current limiting means 16 as to whether the present time is within a predetermined time period from the start of energization in the another of the other cylinders.

If the present time is not within the predetermined time period, that is, the predetermined time period has passed, the ion current is output to the current distributor 6 by the ion current limiting means 16 in step 105. If the present time is within the predetermined time period, waiting to the end of the predetermined time period after the start of energization in the another of the other cylinders is performed by the timer means 16a in the ion current limiting means 16. By this waiting, the supply of ion current to the current distributor 6 is stopped.

Since the detection of ion current is limited and since the supply of ion current to the current distributor 6 is stopped, no false ion current is generated, as shown in (g) of FIG. 2, and only normal combustion pulses result, as shown in (j) of FIG. 2.

Since the supply of ion current to the current distributor 6 is stopped for a predetermined period of time, no false ion current is generated, as shown in (g) of FIG. 2, and only knock pulses result, as shown in (j) of FIG. 2.

Further, a method may be used in which the ion current limiting means 16 converts the ion current into digital data and a digital link is made between the data on the ignition coil in the another cylinder at the start of energization and the data on the another cylinder after a lapse of the predetermined time period from the start of energization. Reconversion of the data to an analog signal may be made, for example, by current distributor 6 or the like at a suitable point in a following stage.

As described above, when energization of the ignition coil for ignition in another of the cylinders is started, a false ion current is generated by electromagnetic induction caused by the start of energization of the ignition coil for ignition in the another cylinder as if combustion is effected or a knock occurs in the cylinder corresponding to the ignition coil through which ion current detection is being performed. According to Embodiment 1 of the present invention, the ion current output and the knock component signal output are limited to prevent output of such false ion current and such false knock component signal, thereby avoiding erroneous combustion determination or erroneous knock determination to greatly improve the detection accuracy.

Embodiment 2

Figure 4:
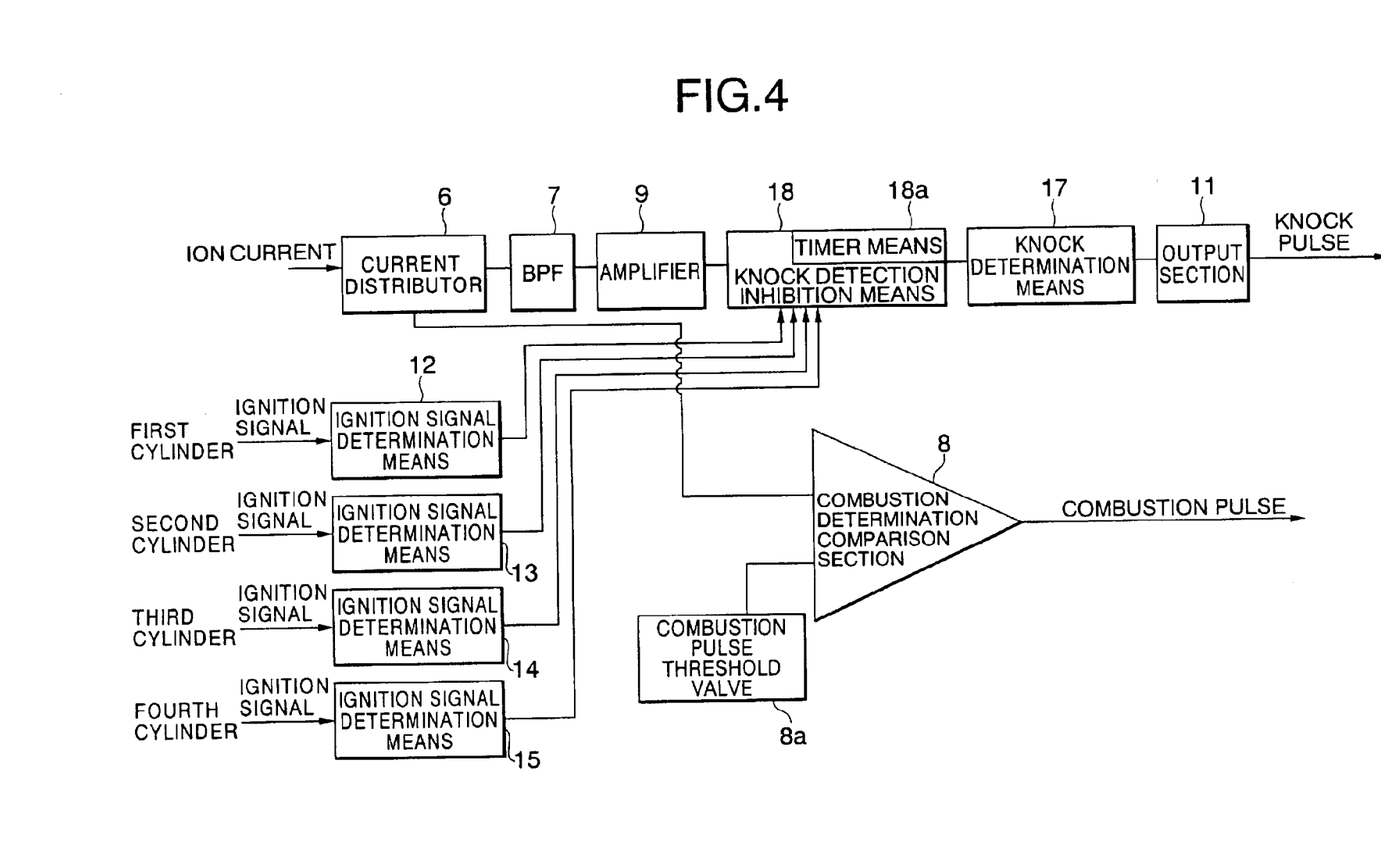
FIG. 4 is a diagram showing the structure of an ion current detector in a combustion condition detection apparatus for an internal combustion engine in Embodiment 2 of the present invention.

A combustion condition detection apparatus for an internal combustion engine in accordance with Embodiment 2 of the present invention will be described with reference to the drawings. FIG. 4 is a diagram showing the structure of an ion current detector in Embodiment 2 of the present invention.

Referring to FIG. 4, the ion current detector has ignition signal determination means 12 to 15, a current distributor 6, a BPF 7, a comparison section 8 for determination of a combusting condition, a combustion pulse threshold value 8a, an amplifier 9, a knock detection inhibition means 18, a timer means 18a, a knock determination means 17, and an output section 11. The knock determination means 17 is the same as the knock determination comparison section 10 shown in FIG. 10, i.e., the section in which the existence of a knock is determined if the vibration component of the knock component signal is larger than the predetermined knock detection threshold value 10a. The comparison section 8 for determination of a combusting condition and the combustion pulse threshold value 8a constitute a combustion determination means.

The operation of the combustion condition detection apparatus for the internal combustion engine in Embodiment 2 of the present invention will now be described with reference to the drawings.

Figure 5:
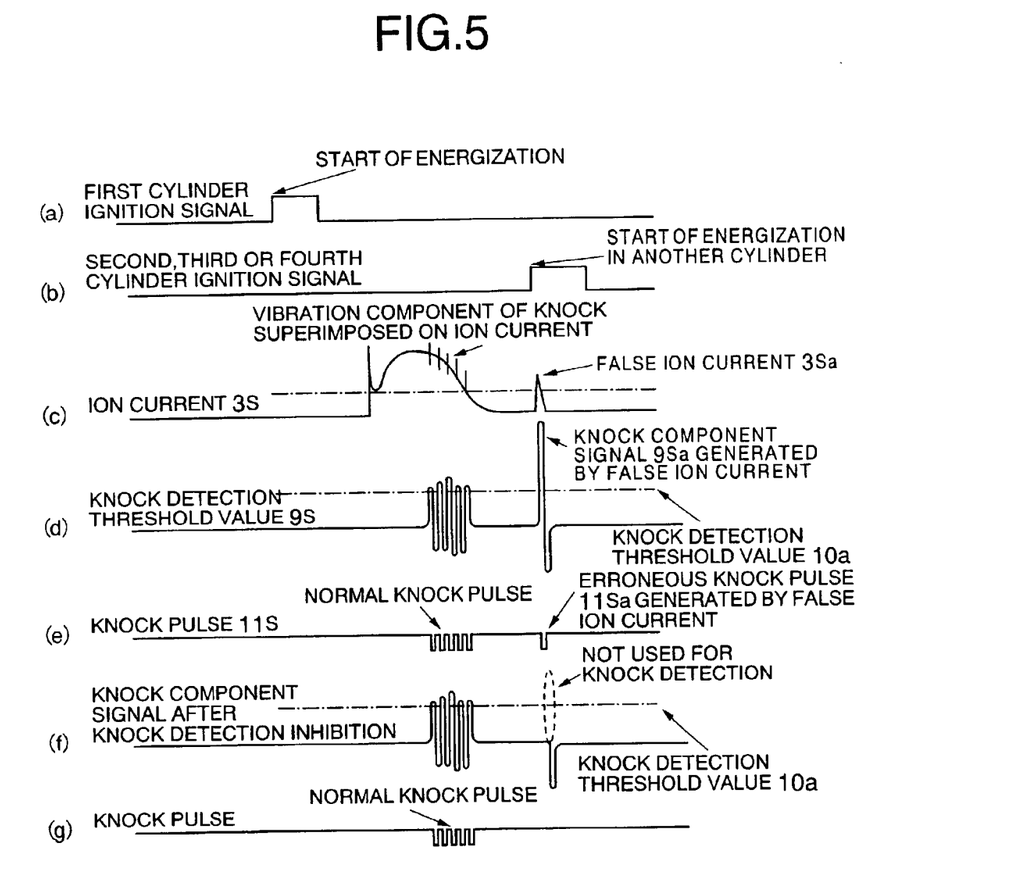
FIG. 5 is a timing chart showing the operation of the ion current detector in Embodiment 2 of the present invention.
Figure 6:
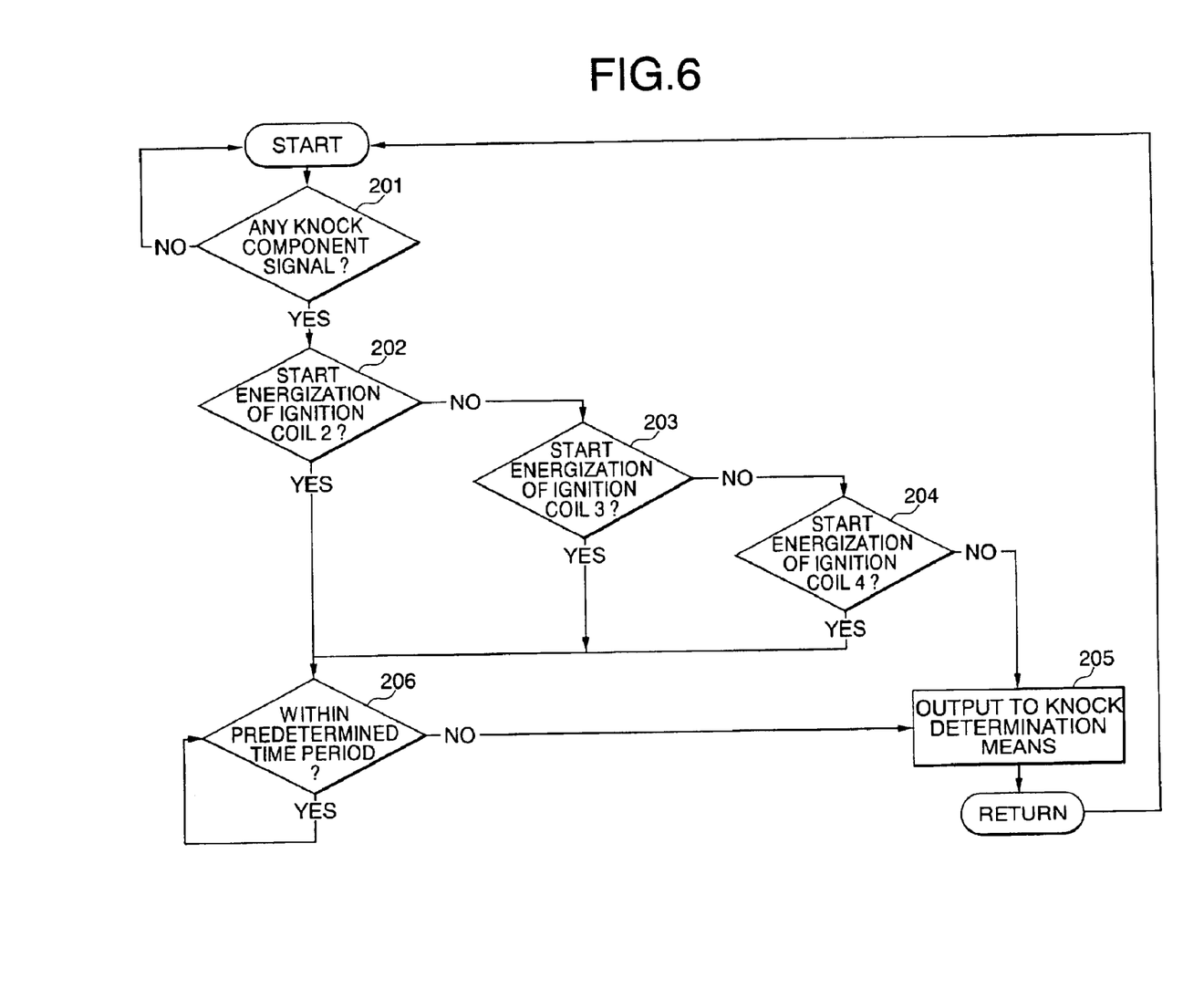
FIG. 6 is a flowchart showing the operation of the ion current detector in Embodiment 2 of the present invention.

FIG. 5 is a timing chart showing the operation of the ion current detector in Embodiment 2 of the present invention. Further, FIG. 6 is a flowchart showing the operation of the ion current detector in Embodiment 2 of the present invention.

When energization of the ignition coil in another of the other cylinders is started, a false ion current 3sa is generated by electromagnetic induction, as shown in (c) of FIG. 5. A knock component signal 9sa is generated by false ion current 3sa in a knock component signal 9s which is extracted by the BPF 7 from one of ion currents distributed by the current distributor 6 and is amplified by the amplifier 9, as shown in (d) of FIG. 5. If this knock component signal 9sa is used for knock detection, an erroneous knock pulse 11sa is generated, as shown in (e) of FIG. 5.

Detection of the knock component signal is inhibited by the knock detection inhibition means 18 so that the knock component signal is as shown in (f) of FIG. 5, no erroneous knock pulse 11sa such as shown in (e) of FIG. 5 is generated, and only normal knock pulses result, as shown in (g) of FIG. 5.

The operation will be described in detail with reference to the flowchart of FIG. 6.

In step 201, when an ion current is input, a determination is made by the knock detection inhibition means 18 as to whether a knock component signal exists. If it is determined that no pulse exist as knock component signal, a determination is again made as to whether a knock component signal pulse exists. If a knock component signal exists, the process advances to step 202.

Next, in steps 202 to 204, determination is made by ignition signal determination means 13 to 15 as to whether energization of one of the ignition coils 2 to 4 in the another cylinder is started. If energization of any of the ignition coils 2 to 4 in the another cylinder is not started, the process advances to step 205. If energization of one of the ignition coils 2 to 4 in the another cylinder is started, the process advances to step 206.

Next, in step 205, the knock component signal is output from the knock detection inhibition means 18 to the knock determination means 17.

On the other hand, in step 206, determination is made by the knock detection inhibition means 18 as to whether the present time is within a predetermined time period from the start of energization in the another of the other cylinders. This predetermined time period is determined by actually measuring the knock component signal 9sa generated by false ion current, as shown in (d) of FIG. 5.

If the present time is not within the predetermined time period, that is, the predetermined time period has passed, the knock component signal is output to the knock determination means 17 by the knock detection inhibition means 18 in step 205. If the present time is within the predetermined time period, detection of the knock component signal is inhibited during the time period corresponding to the first pulse after the start of energization in the another cylinder by the knock detection inhibition means 18.

Since the knock component signal is not supplied to the knock determination means 17 by the knock detection inhibition means 18 during the predetermined time period, knock determination is not made and no false knock component signal is generated, as shown in (f) of FIG. 5, and only normal knock pulses result, as shown in (g) of FIG. 5.

While the predetermined time period is set as described above, it is desirable that the predetermined time period be extended to the end of vibration if noise vibration does not end by one wave.

A method may also be used in which detection of the knock component signal during the predetermined time period after a start of energization of the ignition coil is inhibited by timer means 18a in the knock detection inhibition means 18 to achieve the same effect.

As described above, when energization of the ignition coil for ignition in another of the cylinders is started, a false ion current is generated by electromagnetic induction caused by the start of energization of the ignition coil for ignition in the another cylinder as if combustion is effected or a knock occurs in the cylinder corresponding to the ignition coil through which ion current detection is being performed. According to Embodiment 2 of the present invention, output of the knock component signal is inhibited to prevent output of such false knock component signal, thereby avoiding erroneous knock determination to greatly improve the detection accuracy.

Embodiment 3

While Embodiments 1 and 2 have been described with respect to a start of energization of the ignition coil for ignition in another of the other cylinders, the above-mentioned operation may be limited to a start of energization of the ignition coil for ignition in the next cylinder.

As described above, when energization of the ignition coil for ignition in another of the cylinders is started, a false ion current is generated by electromagnetic induction caused by the start of energization of the ignition coil for ignition in the another cylinder as if combustion is effected or a knock occurs in the cylinder corresponding to the ignition coil through which ion current detection is being performed. According to Embodiment 3 of the present invention, the ion current output and the knock component signal output are limited to prevent output of such false ion current and such false knock component signal, thereby avoiding erroneous combustion determination or erroneous knock determination to greatly improve the detection accuracy.

Embodiment 4

Figure 7:
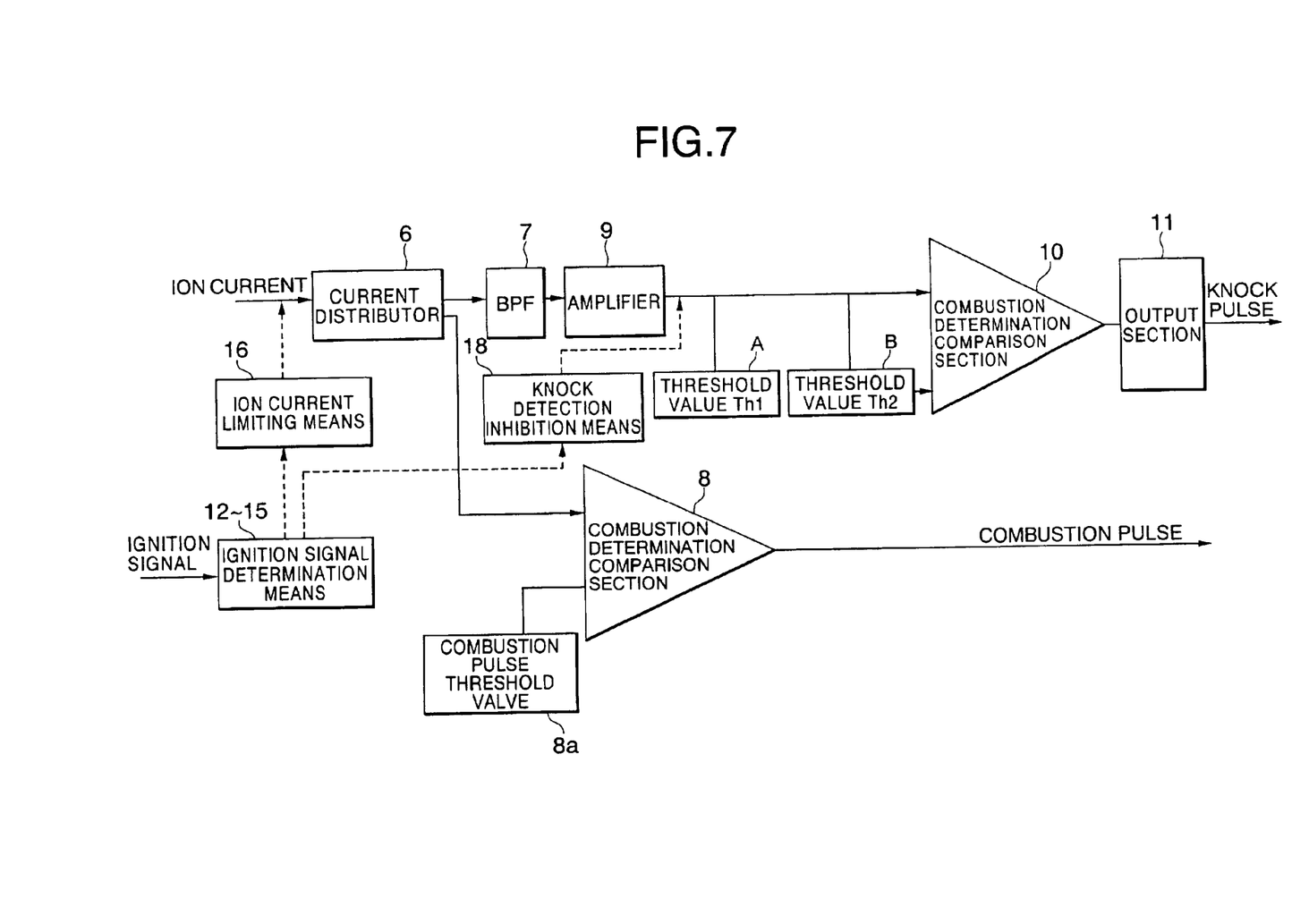
FIG. 7 is a diagram showing the structure of an ion current detector in a combustion condition detection apparatus for an internal combustion engine in Embodiment 4 of the present invention.

A combustion condition detection apparatus for an internal combustion engine in accordance with Embodiment 4 of the present invention will be described with reference to the drawings. FIG. 7 is a diagram showing the structure of an ion current detector in Embodiment 4 of the present invention.

Referring to FIG. 7, the ion current detector has a current distributor 6, a BPF 7, a comparison section 8 for determination of a combusting condition, a combustion pulse threshold value 8a, an amplifier 9, a knock determination comparison section 10, and an output section 11. Further, the ion current detector has ignition signal determination means 12 to 15, an ion current limiting means 16 having a timer means 16a, and a knock detection inhibition means 18 having a timer means 18. The comparison section 8 for determination of a combusting condition and the combustion pulse threshold value 8a constitute a combustion determination means.

The operation of the combustion condition detection apparatus for the internal combustion engine in Embodiment 4 of the present invention will now be described with reference to the drawings.

Figure 8:
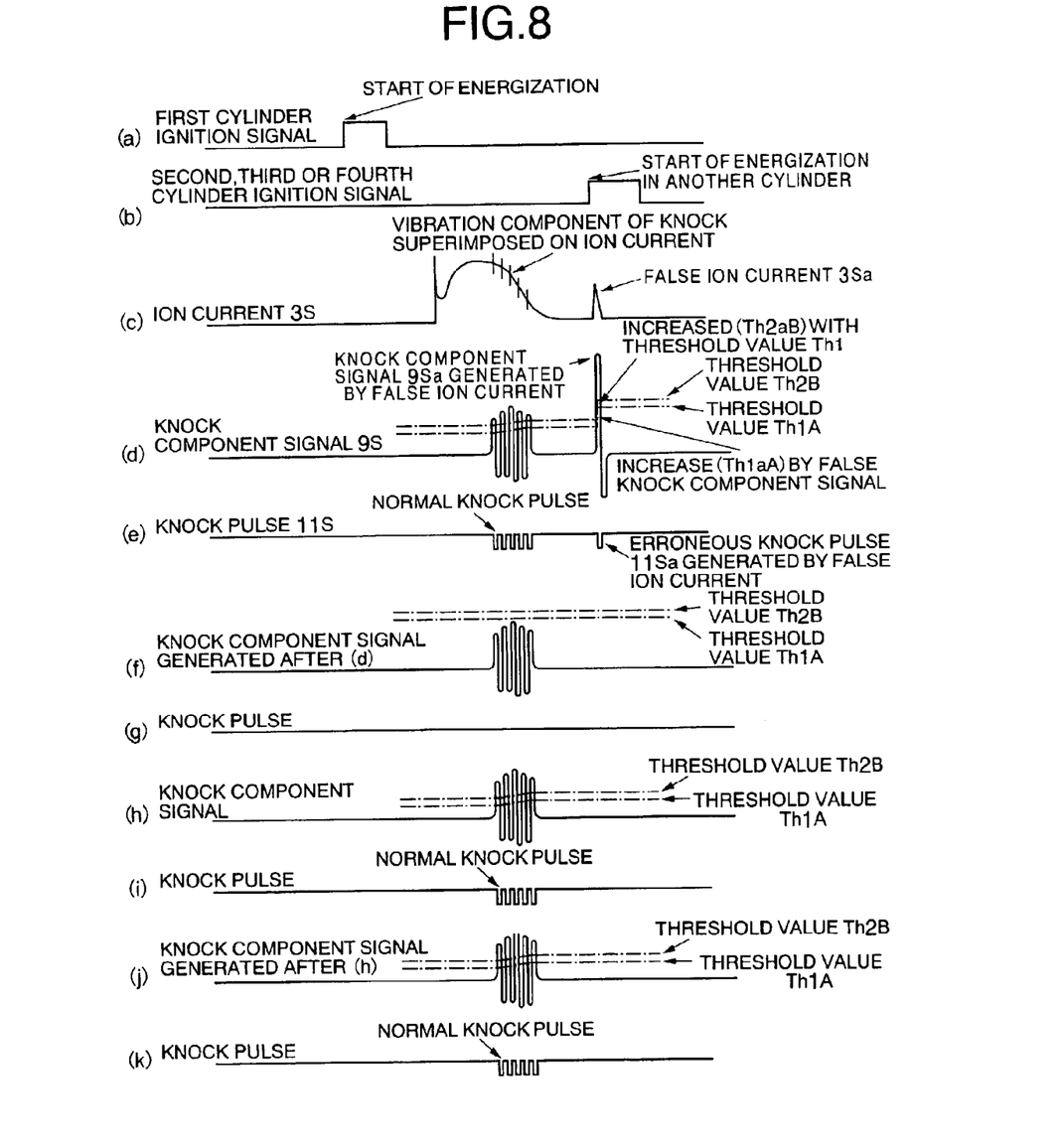
FIG. 8 is a timing chart showing the operation of the ion current detector in Embodiment 4 of the present invention.

FIG. 8 is a timing chart showing the operation of the ion current detector in Embodiment 4 of the present invention.

When energization of the ignition coil in another of the other cylinders is started, a false ion current 3sa is generated by electromagnetic induction, as shown in (c) of FIG. 8. A knock component signal 9sa is generated by false ion current 3sa in a knock component signal 9s which is extracted by the BPF 7 from one of ion currents distributed by the current distributor 6 and is amplified by the amplifier 9, as shown in (d) of FIG. 8. A threshold value Th1A determined according to charge-discharge balance is increased (Th1aA) by charging with this knock component signal, as shown in (d) of FIG. 8. With this increase, a knock detection threshold value Th2B determined by a function of the threshold value Th1A is also increased (Th2aB), as shown in (d) of FIG. 8.

In this situation, knock pulses 11s are formed as shown in (e) of FIG. 8. If a knock component signal such as shown in (f) of FIG. 8 is generated as a result of the increase in threshold value Th1A and the increase in threshold value Th2B caused by false knock component signal 9sa, threshold values Th1A and threshold values Th2B become as shown in (f) of FIG. 8. Then, the knock component signal is not detected and knock pulses 11s are formed as shown in (g) of FIG. 8. That is, there is a fear of failure to detect a knock, which should essentially be detected.

Therefore, as in the above-mentioned Embodiment 1 or 2, detection of false ion current 3sa or false knock component signal 9sa is avoided by using the ion current limiting means 16 or the knock detection inhibition means 18. In this case, the knock component signal becomes as shown in (h) of FIG. 8, the threshold value Th1A is not increased by charging with false knock component signal 9sa, and the threshold value Th2B is also as shown in (h) of FIG. 8. Knock pulses such as shown in (i) of FIG. 8 result.

The threshold value Th1A and the threshold value Th2B are not increased by false knock component signal 9sa, so that, even when a knock component signal such as shown in (j) of FIG. 8 is thereafter generated, the threshold value Th1A and the threshold value Th2B are as shown in (j) of FIG. 8 and the knock component signal is detected. Knock pulses obtained in this case are as shown in (k) of FIG. 8.

What is claimed is:

1. A combustion condition detecting apparatus for an internal combustion engine, comprising:

an ignition coil for generating a high voltage for ignition on the basis of an ignition signal;

an ignition plug which makes a spark to ignite a fuel-air mixture when the high voltage for ignition of the ignition coil is applied thereto; and an ion current detector which detects an ion current generated in a combustion chamber in the internal combustion engine immediately after ignition, extracts a knock vibration component from the detected ion current, outputs a knock pulse when the knock vibration component is larger than a knock detection threshold value, and inhibits detection of the ion current while a false ion current is being generated, wherein the ion current detector includes:

a current distributor which distributes the ion current;

a band pass filter which extracts the knock vibration component from an output from the current distributor;

knock determination means of outputting the knock pulse if the extracted knock vibration component is larger than the knock detection threshold value;

combustion determination means of outputting a combustion pulse when an output from the current distributor is larger than a combustion pulse threshold value;

ignition signal determination means of making a determination on the basis of the ignition signal as to whether energization of the ignition coil for ignition in another cylinder is started; and ion current limiting means provided in front of the current distributor, the ion current limiting means limiting the output of the ion current to the current distributor during a predetermined time period after the start of energization of the ignition coil for ignition in the another cylinder.

2. An apparatus according to claim 1, wherein the ion current limiting means measures the predetermined time after the start of energization of the ignition coil for ignition in the another cylinder by timer means, and stops supply of the ion current to the current distributor while measuring the predetermined time period.

3. An apparatus according to claim 2, wherein the ion current limiting means limits the output of the ion current to the current distributor during the predetermined time period after the start of energization of the ignition coil for ignition in the another cylinder.

4. An apparatus according to claim 1, wherein the ion current limiting means makes a digital link between ion current data at the start of energization of the ignition coil for ignition in the another cylinder and ion current data after a lapse of the predetermined time period from the start of energization of the ignition coil for ignition in the another cylinder, and outputs the data.

5. An apparatus according to claim 4, wherein the ion current limiting means limits the output of the ion current to the current distributor during the predetermined time period after the start of energization of the ignition coil for ignition in the another cylinder.

6. A combustion condition detecting apparatus for an internal combustion engine, comprising:

an ignition coil for generating a high voltage for ignition on the basis of an ignition signal;

an ignition plug which makes a spark to ignite a fuel-air mixture when the high voltage for ignition of the ignition coil is applied thereto; and an ion current detector which detects an ion current generated in a combustion chamber in the internal combustion engine immediately after ignition, extracts a knock vibration component from the detected ion current, outputs a knock pulse when the knock vibration component is larger than a knock detection threshold value, and inhibits detection of the knock vibration component while a false ion current is being generated, wherein the ion current detector includes:

a current distributor which distributes the ion current;

a band pass filter which extracts the knock vibration component from an output from the current distributor;

knock determination means of outputting the knock pulse if the extracted knock vibration component is larger than the knock detection threshold value;

combustion determination means of outputting a combustion pulse when an output from the current distributor is larger than a combustion pulse threshold value;

ignition signal determination means of making a determination on the basis of the ignition signal as to whether energization of the ignition coil for ignition in another cylinder is started; and knock detection inhibition means inserted between the band pass filter and the knock determination means, the knock detection inhibition means inhibiting the output of the knock vibration component to the knock determination means during a predetermined time period after the start of energization of the ignition coil for ignition in the another cylinder.

7. An apparatus according to claim 6, wherein the knock detection inhibition means measures the predetermined time after the start of energization of the ignition coil for ignition in the another cylinder by timer means, and stops supply of the knock vibration component to the knock determination means while measuring the predetermined time period.

8. An apparatus according to claim 7, wherein the knock detection inhibition means inhibits the output of the knock vibration component to the knock determination means during the predetermined time period after the start of energization of the ignition coil for ignition in the another cylinder.

9. An apparatus according to claim 6, wherein the knock detection inhibition means inhibits the output of the knock vibration component to the knock determination means during a time period after the start of energization of the ignition coil for ignition in the another cylinder, the time period being determined by actually measuring the knock vibration component generated by the false ion current.

10. An apparatus according to claim 9, wherein the knock detection inhibition means inhibits the output of the knock vibration component to the knock determination means during the predetermined time period after the start of energization of the ignition coil for ignition in the another cylinder.

* * * * *